Oct. 31, 1972      SHINJI KAWAI      3,701,616

BRAKING FORCE REGULATING ASSEMBLY

Filed July 6, 1970      3 Sheets-Sheet 1

INVENTOR.
Shinji Kawai
BY
Pierce, Scheffler & Parker
Attorneys

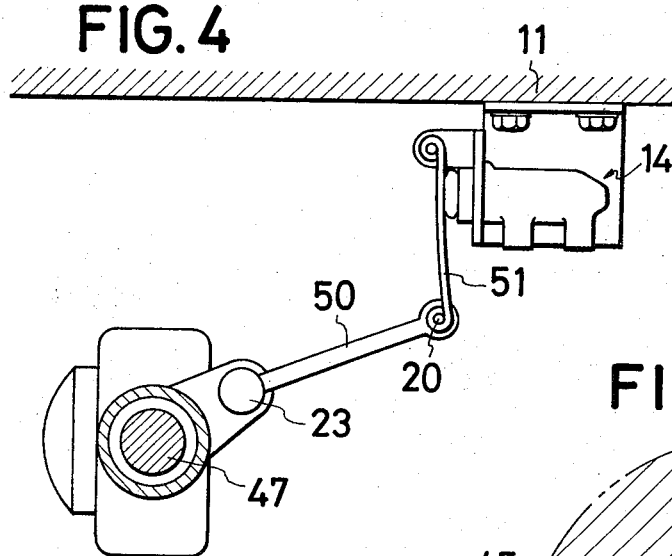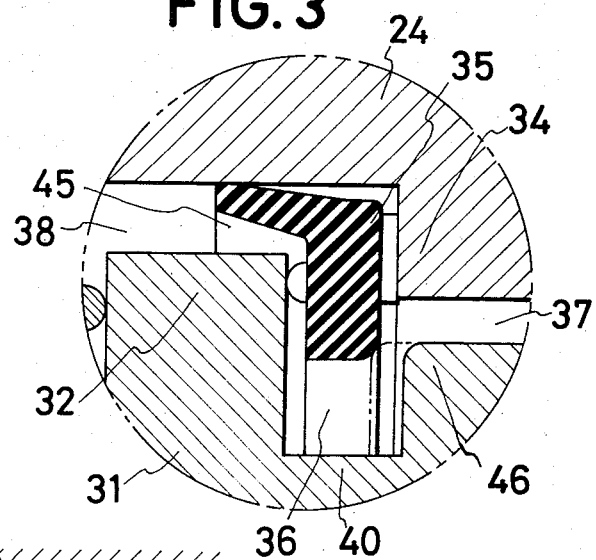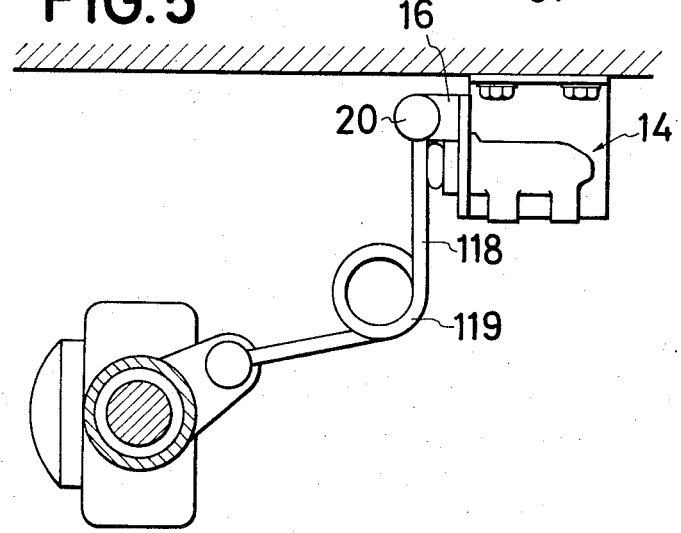

United States Patent Office 3,701,616
Patented Oct. 31, 1972

3,701,616
BRAKING FORCE REGULATING ASSEMBLY
Shinji Kawai, Toyota, Japan, assignor to Aisin Seiki
Kabushiki Kaisha, Kariya, Aichi, Japan
Filed July 6, 1970, Ser. No. 52,247
Claims priority, application Japan, July 14, 1969,
44/55,938
Int. Cl. B60t 8/22
U.S. Cl. 303—22 R 12 Claims

ABSTRACT OF THE DISCLOSURE

A braking force regulating assembly for use on the vehicle to vary the hydraulic pressure dependent upon the wheel load, comprising a brake force controlling valve and a member responsive to the wheel load which is arranged to cooperate with the controlling valve in such manner as to increase a responsive load on said wheel load responsive means in dependence upon increases of the wheel load and to decrease said responsive load after said wheel load has attained a predetermined value.

BACKGROUND OF THE INVENTION

This invention relates to a braking pressure regulating assembly depending upon the wheel load, more particularly, this invention relates to a load responsive regulating assembly disposed in the hydraulic brake system for varying the brake force from the master cylinder to the wheel brake cylinders dependent upon the load on the vehicle suspension.

In braking systems for vehicles, it is desired to arrange for the braking pressure applied to the vehicle wheels to increase at a different rate from that at which the master cylinder pressure increases. For example, it is desired to have the pressure at the rear brakes increase at a reduced rate, relative to the master cylinder pressure, after a predetermined pressure (the cut-off pressure) has been developed in the master cylinder, in order to take account of weight transfer from the rear of the vehicle to the front during braking and thereby reduce the risk of the rear wheels skidding.

So as to accomplish the above purpose, there has been proposed a load sensing regulator comprising a hydraulic cylinder, a differential piston slidably fitted within the cylinder and provided with large and small effective surfaces on which the hydraulic pressure is applied, a valve for controlling the opening and closing of the fluid passageway between two chambers constituted by the differential piston, said two chambers communicating with the master cylinder and the wheel brake cylinders, respectively, a valve spring urging the piston to keep the valve normally open, and a load sensing mean for determining the operating characteristics of the valve.

However, the conventional load sensing means is undesirable because it is comprised of the compression spring or tension spring which is varied in proportion to the variations of the wheel load, that is to say, the characteristic line of the spring load relative to the wheel load may be shown by a straight line. According to this method, it is necessary to provide a spring suitable for the maximum wheel loading when the vehicle passes over a rough road and for the minimum loading such as during the jacking operation of the vehicle, that is to say, it is necessary to provide a spring which can function not only under usual circumstances but also under abnormal circumstances.

SUMMARY OF THE INVENTION

The principal object of the invention is, therefore, to provide the brake force regulating assembly with a wheel load responsive means wherein the maximum response of the latter is very small in comparison to the conventional one.

Another object of the invention is to provide a wheel load responsive means wherein the construction is simple and may be manufactured economically.

The above and other objects and advantages of the invention are attained by a construction comprising a hydraulic pressure controlling device mounted on either the chassis or the wheel axle housing and including a movable differential piston therein, a fluid passageway for connecting the master cylinder and the wheel brake and adapted to be closed by actuation of the piston, a load responsive means pivotally mounted at one end to the controlling device and at the other end to the chassis or axle housing for exerting a biasing force on the piston and adapted to increase the biasing force on the piston in dependence upon increases of the wheel load and to decrease said biasing force after said wheel load has attained a predetermined value.

The invention will now be further described with reference to the accompanying drawings which illustrate, by way of example, several embodiments of a braking force regulating assembly in accordance with the invention.

BRIEF DESCRIPTION OF THE DRAWINGS

In the drawings:
FIG. 3 is an enlarged view of a portion encircled by the circle III in FIG. 2;
FIGS. 4 to 6 are elevational views of modifications of wheel load responsive means of the assembly.

DETAILED EXPLANATION

Figure 1:
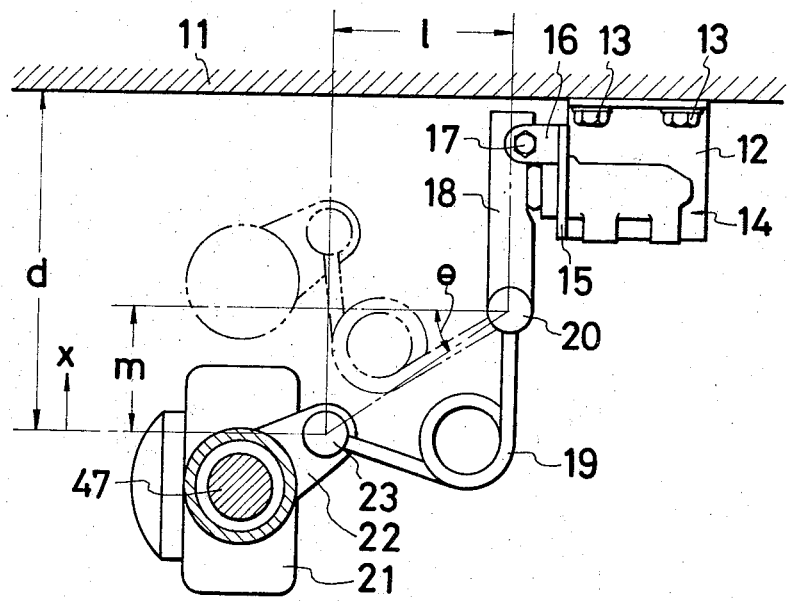
FIG. 1 is a front elevation view partly in section of one embodiment of the invention.
Figure 2:
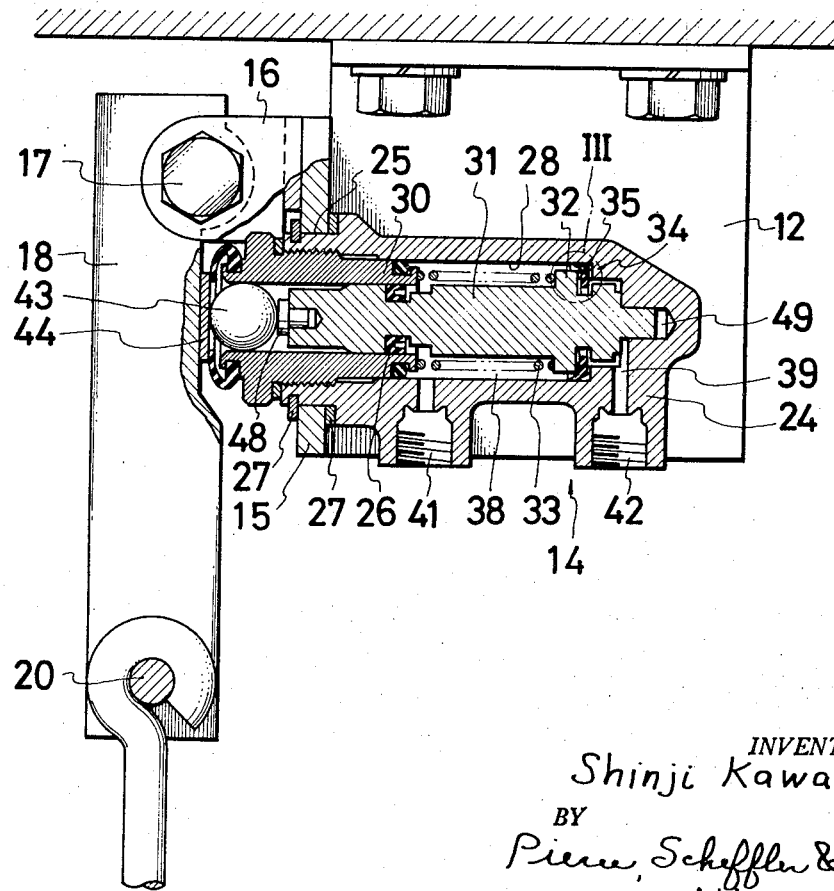
FIG. 2 is an enlarged elevation view partly in section of a pressure controlling device of the assembly.

Referring to the drawings, especially FIGS. 1 and 2 thereof, a bracket 12 is secured to a chassis portion 11 of the vehicle by means of bolts 13. The bracket 12 includes at one end a perpendicular flange 15 to which a hydraulic brake pressure controlling device 14 is fixed. The structure and operation of the device 14 will be described in more detail hereinafter, although this device forms no part of the present invention. A flange 16 of channel-shape in section is welded at one end to the perpendicular flange 15 and at the other end pivotally receives one end of a lever 18 by means of a pin 17. One end of a spring 19 which is a compression coil spring is pivotally mounted on the other end portion of the lever 18 by means of a pin 20, while the other end of the spring 19 is pivotally mounted on a flange 22 of a rear axle housing 21 by a pin 23. A rear axle 47 passes through the housing 21. A normal spring suspension (not shown) is provided between the chassis 11 and the axle housing 21.

The pressure controlling device 14 comprises a cylindrical housing 24 which is mounted in an opening 25 in the perpendicular flange 15 and fixed thereto by snap rings 27 (FIG. 2). The cylindrical housing 24 is opened at one end only. The open end of the housing 24 is internally screw-threaded to engage the screwthreaded portion of an annular plug 30.

Within a bore in the plug 30 and a bore 28 in the housing 24, there is slidably fitted a diffrential piston 31 including a shoulder 32 near the axially forward end thereof. A helical spring 33 is interposed between the end of the plug 30 and the shoulder 32 to bias the differential piston 31 to the right in FIG. 2, that is to say, in the forward direction.

There is provided a sealing cup 26 between the axially rearward stem of the piston 31 and the reduced diameter portion thereof.

A valve cup 35 is provided between the shoulder 32 of the piston 31 and a stepped portion 34 of the housing 24 so as to subdivide with the piston 31 the bore 28 into a first pressure chamber 38 communicating an inlet port 41 and a second pressure chamber 39 including a hole 49 and communicating with an outlet port 42.

The hydraulic pressure from the master cylinder via the chamber 38 is admitted to the chamber 39 through a first fluid passageway 45 as shown in FIG. 3 formed between the shoulder 32 and the valve cup 35, a second fluid passageway 36 formed between a reduced diameter portion 40 of the piston 31 and the valve cup 35, and a third fluid passageway 37 formed between the stepped portion 34 of the housing 24 and another shoulder 46 of the piston 31.

It should be noted that the valve cup 35 will be sealingly engaged with shoulder 46 of the piston 31 when the piston 31 is moved by the hydraulic pressure in the left direction to the position as indicated by the dotted line in FIG. 3 so that intercommunication between the two chambers 38 and 39 may be interrupted.

At the axially rearward end of the piston 31, which is exposed to the air, there is securely fitted a pin 48 which is in contact with a ball member 43. The ball 43 is operatively connected to the lever 18 through a base plate 44 welded thereto. It will be apparent that when the lever 18 is caused to rotate around the pivot pin 17 in the counter-clockwise direction in FIG. 2 the ball member 43 is urged to press the differential piston 31 through the pin 48 in the right direction. The provision of the ball 43 affords smooth transmission of the force from the lever 18 to the piston 31.

The pressure controlling device 14 operates as follows:

On flow of hydraulic pressure from the master cylinder to the inlet port 41, hydraulic pressure flows through the chamber 38, thence through the fluid passageways 45, 36 and 37, the chamber 39, the hole 49, and the outlet port 42, to the wheel brake cylinders. The force supplied to the wheel brakes is thus proportional to the force applied to the master cylinder.

When the pressure of the liquid from the master cylinder reaches a predetermined value the protractile stroke of the piston 31 begins. The pressure in the master cylinder at this time may be expressed by the following formula:

$$Pm = \frac{Ps}{B}$$

where, $Pm$ is the pressure in the master cylinder;
$Ps$ is the resilient force of the spring 33;
$B$ is the area of the rearward stem portion of the piston 31.

When the piston 31 has shifted to the left in FIG. 2 to make sealing contact with the valve cup 35, causing the valve cup 35 to intercept liquid flow through the third passageway 37, reduction in pressure in the chamber 39 and the hole 49 with respect to the pressure in the master cylinder begins.

When the pressure in the master cylinder has reached a predetermined value, the differential piston 31 is caused to move in the right direction to re-establish communication between chamber 38 and the chamber 39, that is to say, communication between the master cylinder and the wheel brake cylinders, so that the pressure in the wheel brake cylinders increases.

The master and wheel brake cylinders are cut-off again from each other by the sealing contact of the valve cup 35 with the shoulder portion 46 of the piston 31 when the pressure in the wheel brake cylinders may be expressed by the following formula:

$$Pw = \left(1 - \frac{B}{A}\right) Pm + \frac{Ps}{A}$$

where, $Pw$ is the pressure in the wheel brake cylinders;
$A$ is the area of shoulder 46 of the piston 31.

Thus, the braking force fluctuates by the repeating valve operation in the device 14 to achieve ideal braking.

This invention comprises the spring member 19 for responding to the wheel load.

Depending on the load being applied to the vehicle, the distance $d$ (see FIG. 1) between the chassis portion 11 and the axle 47 will vary. When the rear axle 47 is displaced to the dotted line position in FIG. 1 (in fact, the chassis 11 is moved down relative to the axle 47), the flexure $\delta$ of the spring member 19 may be expressed by the following formula:

$$\delta = \sqrt{l^2 + m^2} - \sqrt{l^2 + (m-x)^2}$$

where, $l$ is the distance between the two ends of the spring member 19 in a horizontal plane;
$m$ is the distance between the ends of the spring member 19 in a vertical plane;
$x$ is the displacement distance of the lower end of the spring member 19 mounted on flange 22 in the vertical direction.

The flexure $\delta$ of the spring member 19 is maximum, that is to say, the force of the spring member 19 for causing rotation of the lever 18 around the pin 17 is maximum when $x$ is equal to $m$ in the above formula, that is to say, the lower end of the spring 19 with the pin 23 is elevated to the same height as the end mounted on pin 20.

Figure 7:
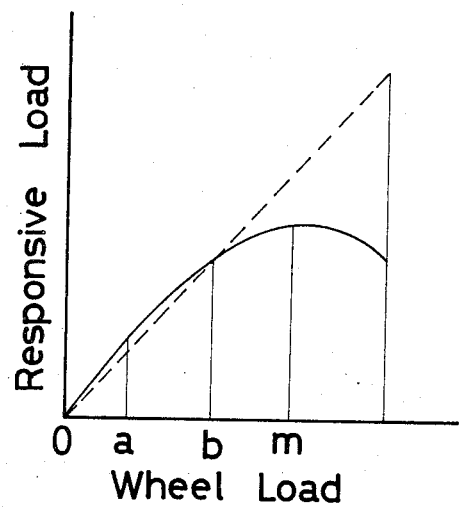
FIG. 7 presents characteristic lines showing a comparison of the present invention with a conventional one.

The characteristic curve of the responsive load $f$ on the spring member 19 exerted on the piston 31 is shown in full line in FIG. 7 in which the dotted line shows the conventional curve.

The load $f$ may be expressed by the following formula:

$$f = K \cdot \delta \cdot \cos \theta$$

where, $K$ is the spring constant;
$\theta$ is the angle between the horizontal line passing through the end of the spring 19 at pin 20 and the line connecting both ends.

Thus, the resilient force of the spring member 19 is applied to the ball 43 through the lever 18 in response to variations of the wheel load. The ball 43 is urged to move the piston 31 in the right direction in FIG. 2, and so supplement the resilient force of the valve spring 33. The more the wheel load increases, the more the combined force of the valve spring 33 and spring 19 increases, so that the cut-off pressure in the wheel brake cylinders is correspondingly increased.

Referring to the operation of the spring member 19 in more detail, its resilient force for applying the counterclockwise rotational movement of the lever 18, that is to say, its load $f$ responsive to the wheel load, is maximum when the end of the spring 19 on pivot pin 23 is elevated up to the same position as the other end thereof on pivot pin 20, moving along the distance $m$. When the end at pivot 23 is elevated further beyond the distance $m$, for instance up to the position shown by the dotted line in FIG. 1, the ends move apart from each other so that the exerting force of the spring member 19 on the piston 31 is decreased.

As will be apparent from the foregoing description and FIG. 7, the responsive load of the spring member 19 is increased in dependence upon increases of the wheel load as long as the spring member 19 is moved within the distance $m$ but the rising ratio of its responsive load is decreased, while when the responsive load itself is decreased (the declining ratio of its responsive load is increased) in dependence upon increases of the wheel load after the responsive load has attained its maximum value, that is to say, as long as the spring member 19 is moved beyond the distance $m$. In FIG. 7, a point $a$ denotes the condition where no load is applied at the wheel while a point $b$ denotes the condition where the maximum load is applied thereon. It should be noted that the normal relative displacement of the chassis portion 11 and the axle 47 will be designed to be less than the distance $m$ so that the responsive load $f$ on the spring 19 is varied between the point $a$ and the point $b$ when the vehicle runs with a normal load.

A first modified form of the load responsive means is shown in FIG. 4. In this form the spring member 19 of the foregoing embodiment is replaced by a connecting rod 50 while the lever 18 is replaced by a leaf spring 51. The other elements are similar to those of the foregoing embodiment. In use, as the distance between the chassis frame 11 and the rear axle 47 becomes smaller, the greater the spring force of the plate spring 51 upon the piston. The exerting force of the responsive means on the piston is maximum when the pin 23 is elevated up to the same height as the pin 20. The resilient force thereof then decreases as the distance between the chassis and rear axle becomes even smaller according to further loading. It will be apparent that any other resilient means, a bar spring for instance, may be substituted for the leaf spring 51.

A second modification of the load responsive member is shown in FIG. 5 wherein one end of a coil spring 119 is pivoted on the flange 16 by the pin 20. According to this modification, one arm 118 of the spring member 119 is directly engaged with the hydraulic pressure controlling device 14. The detailed description of this form will be omitted as it is substantially similar to the foregoing embodiments.

Figure 6:
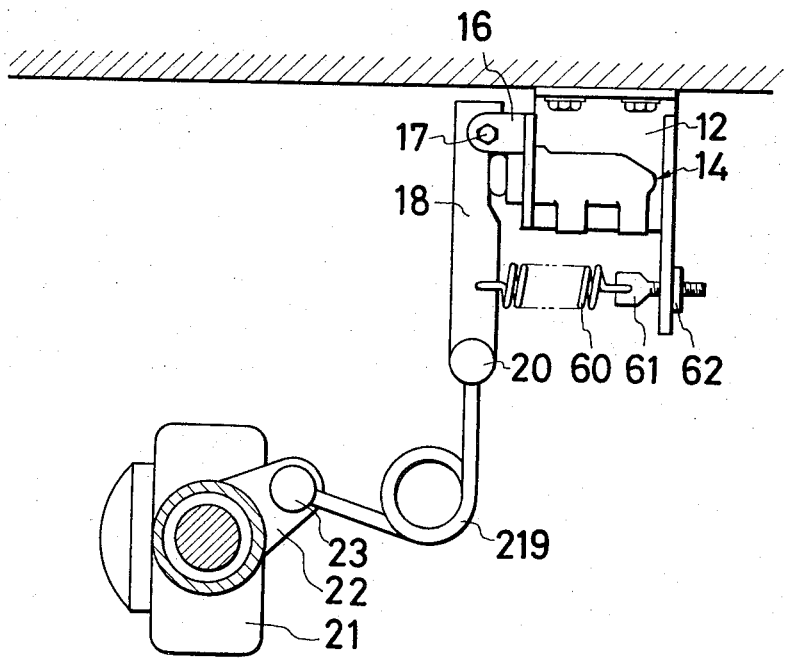

A third modification of the vehicle load responsive means is shown in FIG. 6. In this form the lever 18 is pivotally mounted on the flange 16 of the bracket 12 by means of the pin 17. One end of a coil spring 219 is pivoted on the lever 18 by the pin 20 whilst its other end is pivoted on the flange 22 of the rear axle housing 21 by the pin 23. It should be noted that the coil spring 219 is not a compression spring but rather a tension spring. Another tension spring 60 is mounted between the bracket 12 and the lever 18. One end of the spring 60 which is attached to the lever 18 is intermediate the two pins 17 and 20. A bolt 61 and a nut 62 are preferably provided between the bracket 12 and the other end of the spring 60 so as to adjust the tensile load of the coil spring 60. The exerting force of the tension spring 60 on the controlling device 14 is designed to be greater than that of the tension spring 219 in normal use. The tension load of the spring member 219 is decreased as the wheel load is increased, that is to say, as the chassis and the axle structure approach each other. When the pin 23 is elevated to the same height as the pin 20, the exerting force of the tension coil spring 219 on the device 14 is minimum so that the maximum valve cut-off force is applied to the differential piston of the controlling device 14 by the spring 60.

When the pin 23 is elevated beyond the pin 20, the tensile load of the spring 219 is increased. The characteristic curve of the load of the responsive means exerted on the device 14 is substantially the same as the foregoing embodiments as is shown in FIG. 7.

It should be recognized that the hydraulic pressure controlling device 14 may be mounted on the axle housing in place of the chasis portion in all the embodiments.

According to the features of the present invention, the wheel load responsive means is arranged to effect the relative angular displacement of its ends in dependence upon the variations in the loading of the vehicle in such a manner that as the wheel load is increased the rising ratio of the responsive load to the wheel load responsive means is decreased. The exerting force thereof on the valve cut-off pressure is maximum when the exerting direction of the responsive means is parallel to that of the differential piston of the hydraulic pressure controlling device. In addition, when there is further loading of the vehicle, the responsive load of the responsive means itself is decreased so that the spring member may be designed to be very small in its maximum load as compared with a conventional one.

I claim:

1. In a vehicle having a chassis and wheel axle housing separated from each other by a suspension system, wheel brake cylinders, a master cylinder and a fluid passageway connecting the brake cylinders to the master cylinder, the improvement which includes a brake force regulating assembly comprising, a hydraulic pressure controlling device secured to one of said chassis and wheel axle housing, said controlling device including a cylinder, a differential piston slidably mounted therein and subdividing said cylinder into two chambers facing piston surfaces of different areas and connected respectively to said master cylinder and said brake cylinders, valve means for controlling intercommunication between said two chambers, and spring means biasing the piston in the direction to keep said valve means normally open, wheel load responsive means pivotally mounted at one end to said pressure controlling device and at its other end to the other of said chassis and said wheel axle housing for exerting a biasing force on said piston, said wheel load responsive means including means to increase the biasing force on said piston during increases of the wheel load and to decrease said biasing force after said wheel load has attained a predetermined value.

2. The assembly as claimed in claim 1 wherein said means for increasing the biasing force on said piston decreases the rising ratio of the biasing force on said piston to increases of the wheel load and increases the declining ratio of the biasing force on said piston to further increases of the wheel load after said biasing force has attained a maximum value.

3. The assembly as claimed in claim 2 wherein said means for increasing the biasing force on said piston comprises a resilient member, said resilient member causing a decrease in the rising ratio of the biasing force of the resilient member to increases of the wheel load.

4. The assembly as claimed in claim 3 and further comprising a lever pivoted at one end to said hydraulic pressure controlling device and wherein said resilient member comprises a compression coil spring pivotally mounted at one end thereof to the other end of said lever.

5. The assembly as claimed in claim 4 wherein said lever engages the piston to transmit thereto the biasing force of the wheel load responsive means.

6. The assembly as claimed in claim 4 wherein said wheel axle housing is mounted for vertical movement with respect to said chassis and said differential piston is mounted in said cylinder for slidable movement horizontally with respect to said chassis.

7. The assembly as claimed in claim 6 wherein said compression coil spring applies the maximum biasing force on said piston when the ends thereof lie in a horizontal plane after an increase in the wheel load.

8. The assembly as claimed in claim 3 wherein said resilient member comprises a compression coil spring having one end portion thereof operatively connected directly to the hydraulic pressure controlling device.

9. The assembly as claimed in claim 3 wherein said resilient member comprises a spring mounted at one end to said hydraulic pressure control device and further comprising a rod mounted at one end thereof to the other of said chassis and wheel axle housing and the other end thereof being pivotally mounted to the other end of said spring.

10. The assembly as claimed in claim 2 wherein said means for increasing the biasing force on said piston comprises a resilient member for exerting the biasing force, said resilient member causing a decrease in the declining ratio of the biasing force of the resilient member to increases of the wheel load.

11. The assembly as claimed in claim 10 wherein said resilient member comprises two tension coil springs, one of which is mounted on one of said chassis and wheel axle housing and the other of which is interposed between said one tension coil spring and said hydraulic pressure control device.

12. The assembly as claimed in claim 11 and further comprising means disposed between said other tension coil spring and said hydraulic pressure control device for adjusting the tensile load on said other tension coil spring.

References Cited

UNITED STATES PATENTS

| | | | |
|---|---|---|---|
| 3,506,313 | 4/1970 | Lawson | 303—22 R |
| 3,442,557 | 5/1969 | Oberthur | 303—22 R |

FOREIGN PATENTS

| | | | |
|---|---|---|---|
| 1,906,461 | 2/1969 | Germany | 188—195 |
| 2,000,053 | 1/1970 | Germany | 188—195 |

MILTON BUCHLER, Primary Examiner

S. G. KUNIN, Assistant Examiner

U.S. Cl. X.R.

188—195